United States Patent
Johnson et al.

(10) Patent No.: US 11,343,463 B2
(45) Date of Patent: May 24, 2022

(54) VIDEO SCRIPT GENERATION, PRESENTATION AND VIDEO RECORDING WITH FLEXIBLE OVERWRITING

(71) Applicant: Johnson, J.R., Manhattan Beach, CA (US)

(72) Inventors: J. R. Johnson, Manhattan Beach, CA (US); Andrew Werhane, Manhattan Beach, CA (US)

(*) Notice: Subject to any disclaimer, the term of this patent is extended or adjusted under 35 U.S.C. 154(b) by 0 days.

(21) Appl. No.: 17/193,509

(22) Filed: Mar. 5, 2021

(65) Prior Publication Data

US 2021/0297625 A1    Sep. 23, 2021

Related U.S. Application Data

(60) Provisional application No. 62/986,019, filed on Mar. 6, 2020.

(51) Int. Cl.
| | |
|---|---|
| *H04N 5/72* | (2006.01) |
| *H04N 5/77* | (2006.01) |
| *H04N 5/222* | (2006.01) |
| *H04N 5/225* | (2006.01) |

(52) U.S. Cl.
CPC ........... *H04N 5/772* (2013.01); *H04N 5/2222* (2013.01); *H04N 5/22525* (2018.08)

(58) Field of Classification Search
None
See application file for complete search history.

(56) References Cited

U.S. PATENT DOCUMENTS

| | | | |
|---|---|---|---|
| 2010/0281375 A1* | 11/2010 | Pendergast | G11B 27/34 715/723 |
| 2012/0081530 A1 | 4/2012 | Kerr | |
| 2016/0006946 A1 | 1/2016 | Cohen | |
| 2016/0330398 A1 | 11/2016 | Recchia | |
| 2017/0068499 A1* | 3/2017 | Xu | H04N 5/77 |
| 2018/0132011 A1 | 5/2018 | Shichman | |
| 2019/0213254 A1* | 7/2019 | Ray | G06N 20/00 |

OTHER PUBLICATIONS

International Search Report and Written Opinion for International Application No. PCT/US2021/21125, dated Jun. 2, 2021.

* cited by examiner

*Primary Examiner* — Eileen M Adams
(74) *Attorney, Agent, or Firm* — Baker Botts L.L.P.

(57) ABSTRACT

A distributed computer system including a story application for a mobile computing device enables generation, presentation, and sharing of media using the device. Under control of a programmed story script, the story application invokes a camera of the device for recording a clip during an iteration for a character in a story while presenting a story script in a teleprompter manner. A clip for each different character in the story may be received to be combined therewith and presented as a scene on mobile computing device for viewing. Another iteration for the character may be recorded, and a resulting new clip may be combined with the clips for the other characters, or with different clips for the other characters, to generate another scene for the story script. Media presentations of the same story include multiple scenes each having a different interpretation. Scenes and/or clips may be shared using different applications.

17 Claims, 9 Drawing Sheets

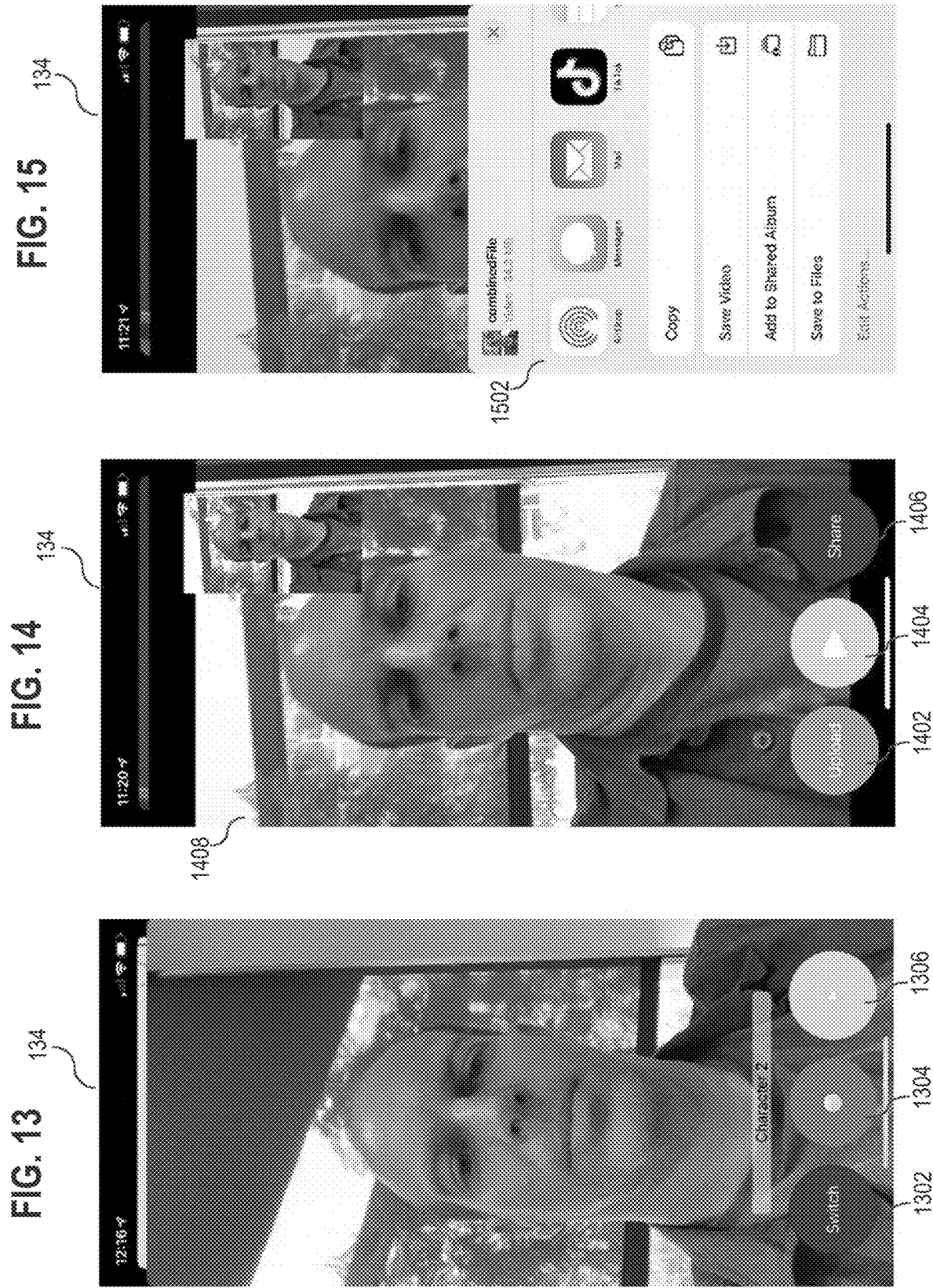

VIDEO SCRIPT GENERATION, PRESENTATION AND VIDEO RECORDING WITH FLEXIBLE OVERWRITING

BENEFIT CLAIM

This application claims the benefit under 35 U.S.C. 119 of provisional application 62/986,019, filed Mar. 6, 2020, the entire contents of which are hereby incorporated by reference for all purposes as if fully set forth herein.

FIELD OF THE DISCLOSURE

One technical field of the present disclosure is generation and presentation of scripts on mobile computing devices. Another technical field is production and presentation of media on mobile computing devices. Another technical field is interactive applications for sharing content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Mobile computing devices are widely used by people of all ages. Social networking applications or apps have become ubiquitous and support communication of text, sharing short videos, sharing images and locations, and other functions involving text, images or video with sound.

For example, social media apps are known that allow users to create and share short videos of themselves and to recreate videos. However, since users have already seen the initial videos that they are recreating, the recreated videos may lack a surprise element and may not provide entertainment. This approach also lacks interactivity as it usually involves a single user recording themselves.

Another technical problem in the field is that it is not simple for multiple devices, which are separated by a large wide geographic area, to independently record different segments of video relating to a unified script and then combine the video. With mobile devices, sharing video clips usually requires sending e-mail attachments, uploading to cloud storage, or some form of in-app messaging, followed by manual editing, joining or stitching together. For example, if a first mobile device user formulates a script for a scene or a story, and more than one character is needed, there is no simple way to arrange the recording of all parts of the script by multiple characters using multiple mobile devices in separated or distant locations, and then join all the recordings into a complete video. The state of the art requires the use of more memory, online storage, network messages and CPU cycles than should be necessary. It also involves an inefficient time delay between the times of recording multiple video segments and the time of creating a unified or edited video; device efficiency would improve if this time, and the computer resources needed, could be reduced. New apps that present each generated video with a different element of surprise are desired.

SUMMARY

The appended claims may serve as a summary of the invention.

BRIEF DESCRIPTION OF THE DRAWINGS

In the drawings:

FIG. 4, FIG. 5, FIG. 6, FIG. 7, FIG. 8, FIG. 9, FIG. 10, FIG. 11, FIG. 12, FIG. 13, FIG. 14, FIG. 15 illustrate a mobile computing device displaying progressive sequences of a story application via a graphical user interface.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:

1. GENERAL OVERVIEW
2. EXAMPLE DISTRIBUTED COMPUTER SYSTEM
3. EXAMPLE PROGRAM FLOW
4. EXAMPLE STORY CREATION AND PRESENTATION
5. IMPLEMENTATION EXAMPLE—COMPUTER HARDWARE OVERVIEW

1. General Overview

A distributed computer system including a story application for a mobile computing device enables generation, presentation, and sharing of media using the mobile computing device. Under control of a programmed story script, the story application invokes a camera of the mobile computing device for recording a clip during an iteration for a character in a story while presenting a story script in a teleprompter manner. A clip for each different character in the story may be received to be combined therewith and presented as a scene on mobile computing device for viewing. Another iteration for the character may be recorded, and a resulting new clip may be combined with the clips for the other characters, or with different clips for the other characters, to generate another scene for the story script. In this manner, media presentations of the same story include multiple scenes each having a different interpretation of the same story. Scenes and/or clips may be shared using multiple different applications executed using the mobile computing device. The story application executes a storytelling mechanism that has been previously unavailable.

2. Example Distributed Computer System

Figure 1:
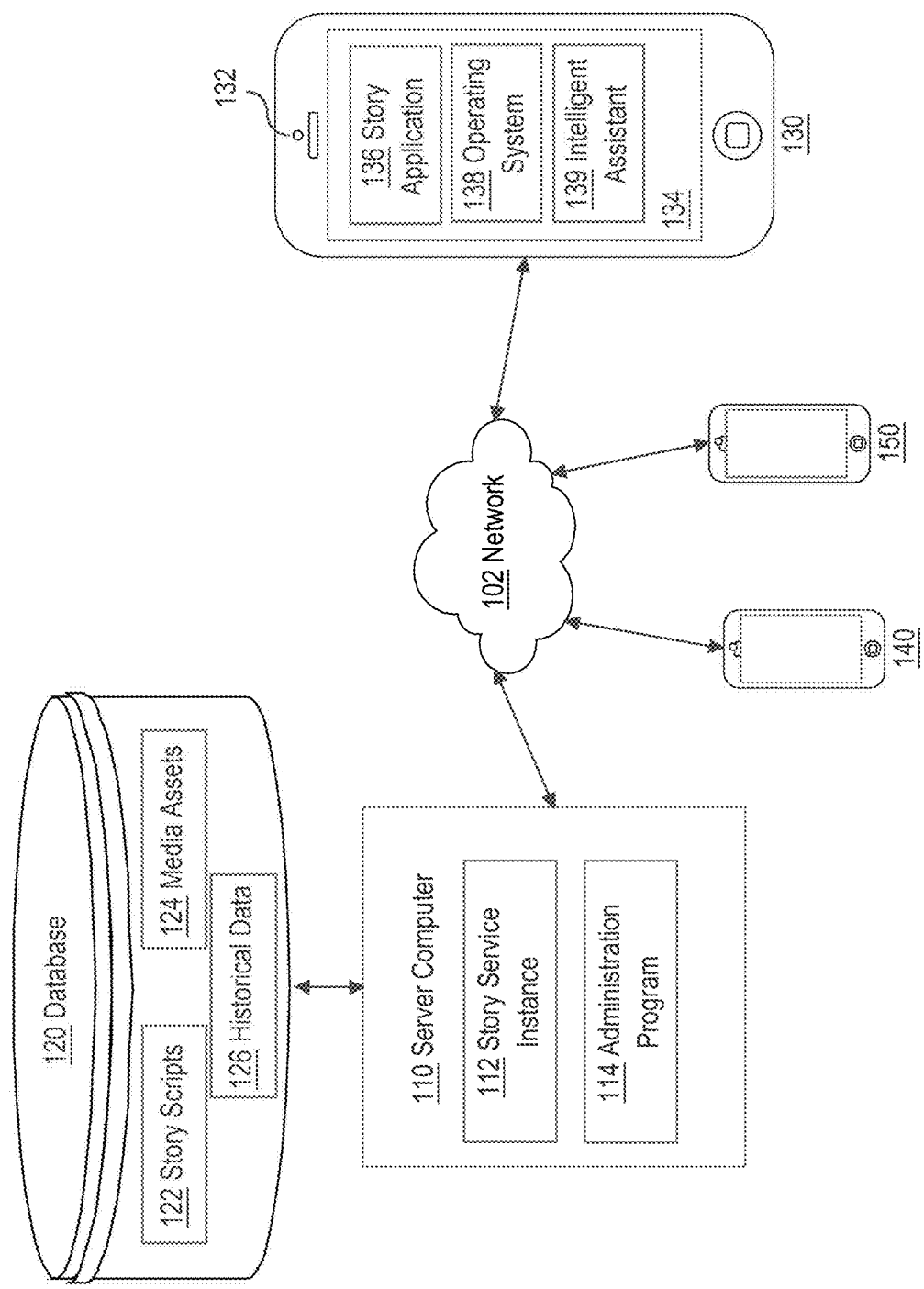
FIG. 1 illustrates an example distributed computer system that may be used to implement an embodiment.

FIG. 1 illustrates an example distributed computer system that may be used to implement an embodiment.

In an embodiment, a server computer 110 is programmed with a story service instance 112 and an administration program 114 and is communicatively coupled to a database 120 that may store story scripts 122, media assets 124, and historical data of users 126, as further described in other sections. In various embodiments, the server computer 110 may comprise any of a desktop computer, rack installed server, cluster of computers, or one or more virtual machine instances that are instantiated and executed using computer hardware in a datacenter or cloud computing facility.

In an embodiment, the server computer 110 is communicatively coupled to a network 102, which broadly represents any one or more of a local area network (LAN), wide area network (WAN), datacenter network and/or one or more internetworks using any of wired, wireless, terrestrial or satellite data communication links.

A plurality of mobile computing devices 130, 140, 150 are communicatively coupled to the network 102 and, therefore, capable of communicating with the server computer 110 using internetworking protocols such as TCP/IP, application-level protocols such as HTTP, and/or application or app protocols for communication between server-side applications and mobile device apps, such as parameterized HTTP. For purposes of illustrating a clear example, FIG. 1 shows three (3) mobile computing devices 130, 140, 150 but, in other implementations, any number of mobile computing devices may be used, and this disclosure specifically contemplates using one or more server computers 110 to interoperate with thousands or millions of mobile computing devices.

Each of the mobile computing devices 130, 140, 150 may comprise any of a smartphone, tablet computer, laptop computer, vehicle computer or other transportable computing device. Referring to the mobile computing device 130 as an example, in an embodiment, each of the mobile computing devices is programmed with, has installed or executes a story application 136, an operating system 138, and an intelligent or virtual assistant 139. The intelligent assistant 139 may be activated and deactivated from and during execution of story application 136. Example intelligent assistants include GOOGLE NOW, GOOGLE ASSISTANT, SIRI, BLACKBERRY ASSISTANT.

The mobile computing device 130 further comprises a front-facing camera 132 (e.g., facing user of mobile computing device 130). The front-facing camera 132 may be activated and deactivated from and during execution of story application 136.

The mobile computing device 130 further comprises a touch-sensitive display device 134 such as a liquid crystal display (LCD), light-emitting diode display or other electronic digital display device capable of displaying media such as text, images and video. The display device 134 may comprise means for detecting touches of human fingers, taps or gestures on the display device, such as a capacitive overlay film that is electronically coupled to a detection circuit and firmware programmed to signal the operating system 138, or a device driver, when touch is detected and the location in terms of coordinates or pixel locations of a touch, tap or gesture.

The mobile computing device 130 further comprises a loudspeaker, microphone, one or more pushbuttons for signaling, volume control buttons, a power on-off button and other hardware, electronics, firmware and software as is conventional for smartphones, tablet computers and the like. These elements are not shown in FIG. 1 to avoid obscuring the focus of the disclosure.

At the server computer 110, the story service instance 112 represents one instance or executing process of a set of computer program instructions that implement a media presentation, program or story for one or more mobile computing devices. Each story service instance 112 provides programmed, server-side services to one or more mobile computing devices to support the presentation of media presentations, programs or stories that are output on the mobile computing devices. For example, in one embodiment, at the time that mobile computing device 130 requests presenting a media presentation, the story service instance 112 establishes an app-specific protocol connection with the story application 136 over the network 102 and transmits or downloads a story script 122, alone or in association with media assets 124, to the story application 136. The story script 122 transmitted to the story application 136 may be currently one of the most popular story scripts among users (e.g., viewed most times within a time period) and/or may be of interest to a user of the computing device 130 according to behavioral data associated with the user.

As another example, when the story application 136 launches, or during its execution, the story service instance 112 provides, authenticates based on configured user permissions associated with, and/or transfers one or more story scripts 122 and/or one or more media assets 124, such as videos, images, text, to the story application 136 for presentation on display device 134. In some embodiments, during execution of the story application 136, the story service instance 112 is programmed to deliver other story media assets as needed, and/or to stream video, audio or other streaming media assets to the story application 136 for presentation. Thus, in various embodiments, all media assets 124 needed to present a media presentation on the display device 134 may be provided to the mobile device 130 before the story application 136 launches, when it launches, or during execution.

At the mobile computing device 130, the story application 136 provides programmed, client-side services to mobile computing device 130. For example, the story application 136 supports generation, displaying, and sharing of new story scripts and media assets, using the mobile computing device 130, during execution of the story application 136.

A story script includes script lines for one or more characters. For example, a story script may be a conversation or dialog exchange between two characters. A script line is a collection of one or more consecutive directions for a character. A direction may be an acting direction or a reading direction. An acting direction directs an actor regarding how to act (e.g., "cover mouth with hand" action or "lean into camera" action) during an iteration of a script line for character. A reading direction directs an actor regarding what to say during an iteration of a script line for a character. A script line includes text written in one or more human-readable languages (e.g., English, Spanish, Italian, Japanese, Mandarin Chinese, etc.) that an actor acts out or reads aloud.

A story script serves as a programmed driver of a media presentation and is parsed or interpreted by the story application 136 on a real-time or just-in-time basis when the story application launches and executes, to result in delivering a media presentation. In various embodiments, script lines may include one or more swappable values that may be expressed in a programming language and/or machine language, code, bytecode, byte stream, tag, or syntax that the story application 108 is capable of executing directly, interpreting or parsing. For example, a word in a script line may begin with a delimiter symbol, such as an "^" or hat symbol, "@" or at symbol, or other delimiter that story application 136 recognizes or identifies as a variable. Each variable is provided with a description during creation of the story script. The description may be provided immediately after the variable, between a set of other delimiter symbols, such as between a "<" symbol and a ">" symbol in the script line, or may be provided when the script line is processed. For example, when the script line is being processed, the story application 136 identifies any variables and prompts for a description for each identified variable in the script line.

In an embodiment, when the script line is being processed, the story application 136 may also evaluate the script line for a time length. The time length of the script line is an amount of time to recite the script line and may be determined using the intelligent assistant 139. For example, the intelligent assistant 139 provides the time it takes to complete recitation of the script line. The time length may be used to estimate how long to display the script line for during an iteration of the script line.

In an embodiment, an existing story script may be used as a base story and new story script may be created therefrom. For example, one or more script lines in the existing story script may be changed or deleted, or new script lines may be added to the existing story script, to create the new story script.

Before an actor iterates script lines for a character in a story script, the story application 136 prompts for user answers to descriptions associated with variables in the script lines for the character. In an embodiment, the story application 136 may also evaluate user answers for corresponding time lengths, using intelligent assistant 139, to update the time lengths for the script lines. An associated period of time for a script line, thus, varies according to the combined time for the user answers. Different user answers for the same variable results in different time lengths for the script line. In this manner, each script line is displayed for a sufficient period of time for the actor to complete during an iteration.

After user answers are received, the story application 136 activates the camera 132 to start recording while displaying the script lines for the character in a teleprompter manner on the display device 134. The script lines include user answers in lieu of variables. In an embodiment, each upcoming script line scrolls to the top of the display device 134 and a start indicator signals to the actor to start acting and/or reading within an associated time period. An amount of time remaining may be represented by a timer bar or countdown timer. The time for the next script line for the actor to scroll up to the top of the display device 134 is based on a total time length of intermediary script lines belonging to other characters.

In an embodiment, the story application 136 may also activate the intelligent assistant 139 to verify that the actor is staying on script (e.g., reading the script lines accurately) to prevent misuse of the story application 136. For example, the intelligent assistant 139 may compare speech-to-text to the script lines and indicate to the story application 136 if there a match or mismatch. If the number of mismatches reaches a certain threshold, the story application 136 may stop recording.

The story application 136 deactivates the camera 132 to stop recording after the iteration of the script lines for the character is completed, resulting in a video clip. In an embodiment, the script lines for the same character may be reiterated for recording, with the same or different user answers.

Before or after the actor completes the iteration of the script lines for the character, the story application 136 may generate or receive a video clip for each of the different characters in the story script for later combination with the actor's clip. In an embodiment, the story application 136 may record on the same mobile computing device 130 to generate a clip corresponding to an iteration of script lines for a different character in the story script. Or, the story application 136 may transmit the script lines for the different character in the story script to another mobile computing device 140, 150, and, in response, receive a clip for the different character. Or, the story application 136 may request the server computer 110 for a clip selected from the media assets 124, in accordance with permissions on the media asset 124.

After clips for all different characters in the story script are made available to the story application 136, the story application 136 concurrently displays the clips for all different characters in the story script for preview on display device 134. The clips may be displayed in different sizes (some larger/smaller than others) or in the same size on display device 134. The clips may be displayed side by side, or some clips may be overlaid on other clips. The story application 136 combines the multiple clips as a single scene, which may be compressed to be shared with others via various applications on mobile computing device 130 and/or saved locally on the mobile computing device 130.

Another iteration for the character may be recorded, and a resulting new clip may be combined with the clips for the different characters, or with other clips for the different characters, to create a new scene for the same story script. In this manner, media presentations of the same story include multiple scenes, each presenting a different element of surprise. Since story scripts may be differently interpreted by different actors and numerous scenes may be created from a plurality of clips for the story script, each scene provides visual entertainment that is unique from other scenes.

Story scripts, clips, and scenes may be associated with permissions set by users/actors who created the story scripts, clips, and scenes, before transmitting to the server computer 110 for storage in the database 120 and sharing with other mobile computing devices. In an embodiment, scenes and clips transmitted to the server computer 110 are uniquely identified and stored as media assets 124 in database 120.

The administration program 114 may be programmed or configured to implement server-side administration functions such as interfacing with the database 120, activating and deactivating particular media presentations to make them available or unavailable for transmission or downloading to mobile computing devices, and other similar administration or control functions.

The database 120 may comprise a set of flat files, a relational database, an object database or other table-based, value-based or object-based data storage repository. In one embodiment, the database 120 digitally stores a plurality of different story scripts 122, media assets 124, historical data 126, and metadata defining a plurality of different media presentations.

Figure 2:
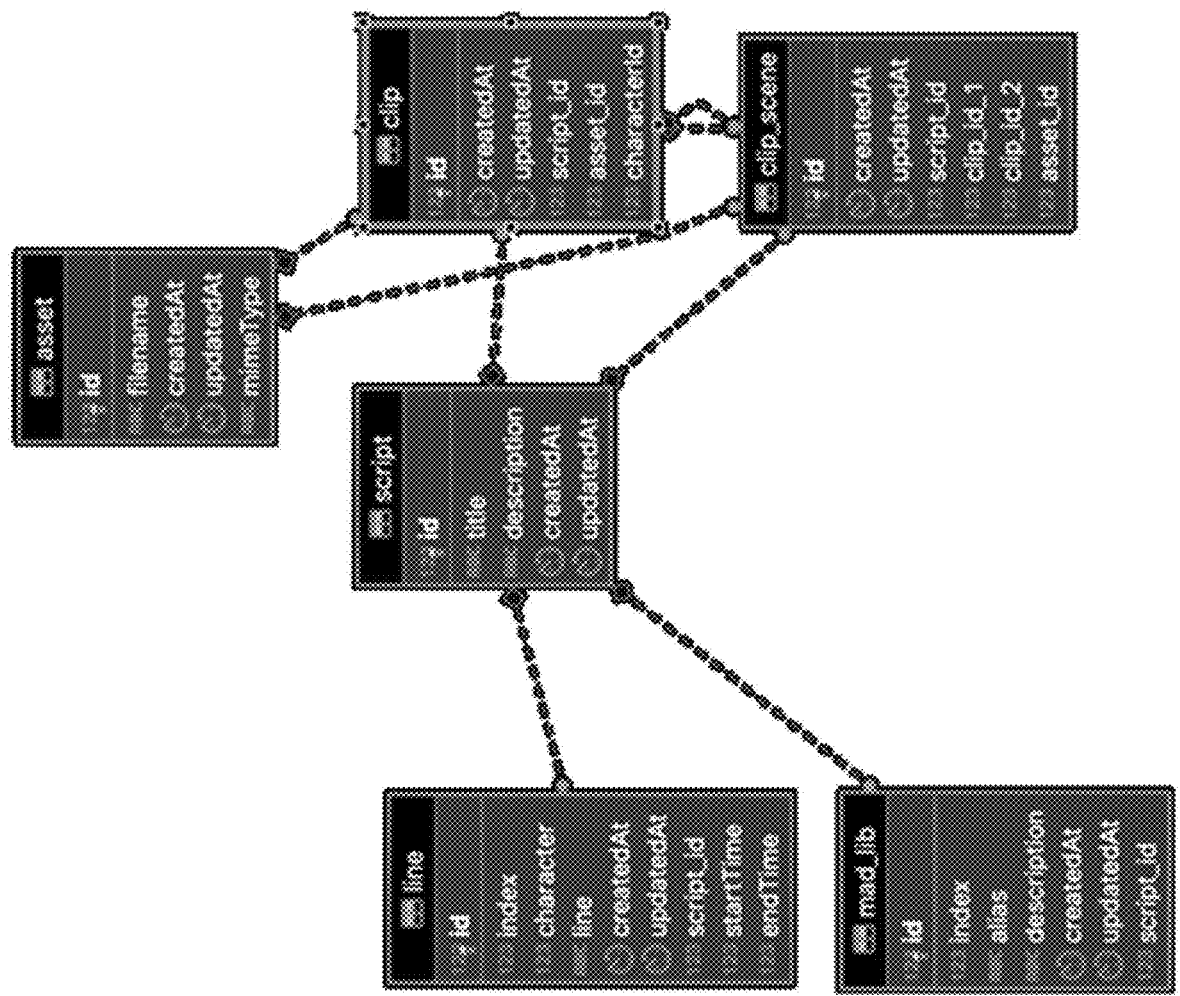
FIG. 2 illustrates an example entity relationship diagram of a database that may be used to implement an embodiment.

FIG. 2 illustrates an example entity relationship diagram of the database 120 that may be used to implement an embodiment.

In some embodiments, user/friend relationships, votes/likes, script versions/modifications, user answers associated with variables, sharing invites, and other information may be tracked and stored in the database 120. For example, data relating to a user's behavior or usage, such as the user's viewing, engagement, and production, may be stored as part of the historical data 126 in the database 120. Viewing data relates to scripts and/or media assets previously viewed by the user. Engagement data relates to feedback (e.g., likes, ratings, comments, etc.) and/or shares previously provided by the user. Production data relates to recordings and/or editing scripts previously performed by the user. Historical data 126 may be used by the story service instance 112 to recommend or suggest scripts and/or media assets and transmit these recommendations to the mobile computing device 130 and other mobile computing devices 140, 150. For example, the story service instance 112 transfers scripts and/or media assets that the user would like to record based on what the user has recorded or edited before.

3. Example Program Flow

Figure 3A:
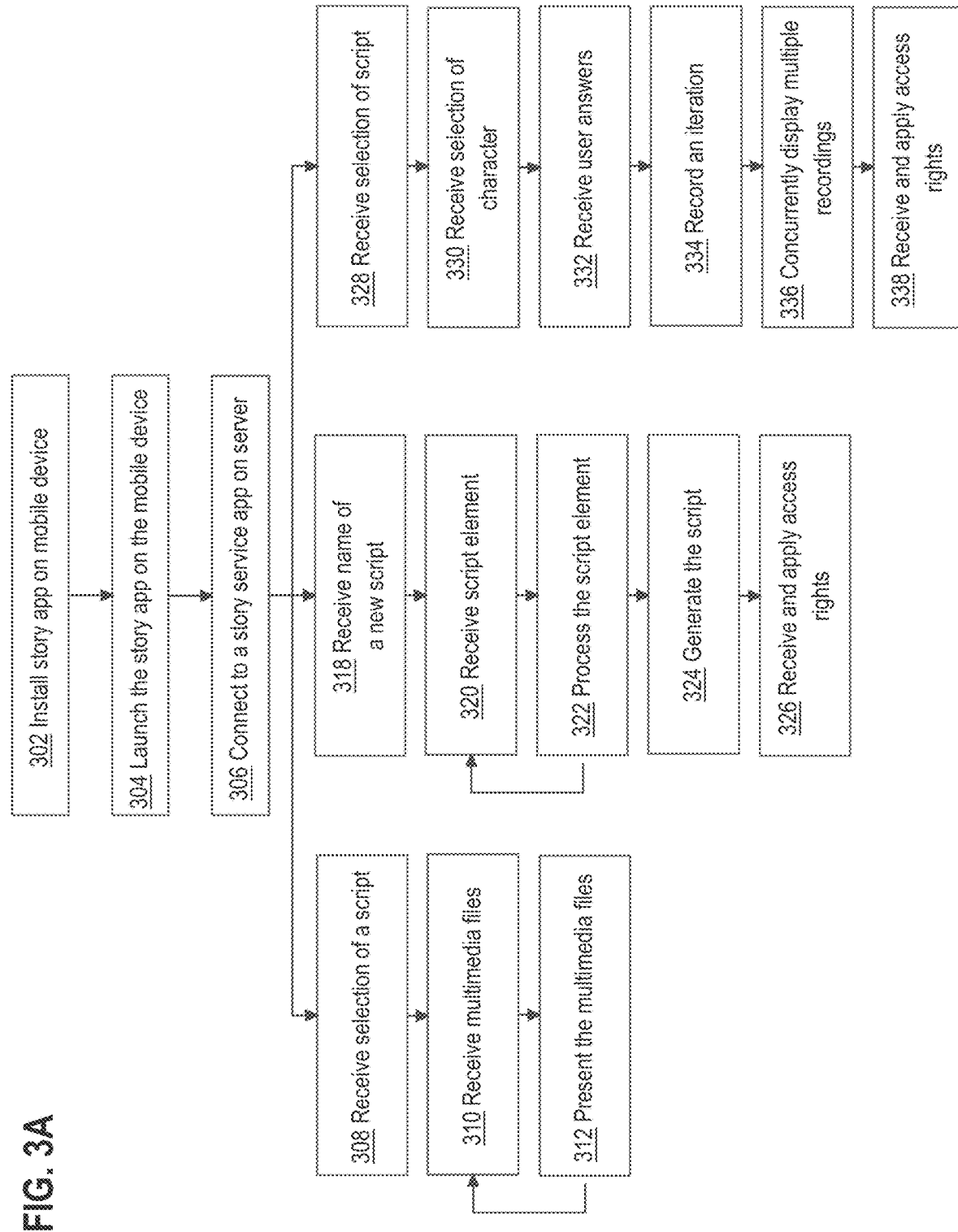
FIG. 3A illustrates an example programmed algorithm that may be used to implement an embodiment of a story application executed using a mobile computing device.
Figure 3B:
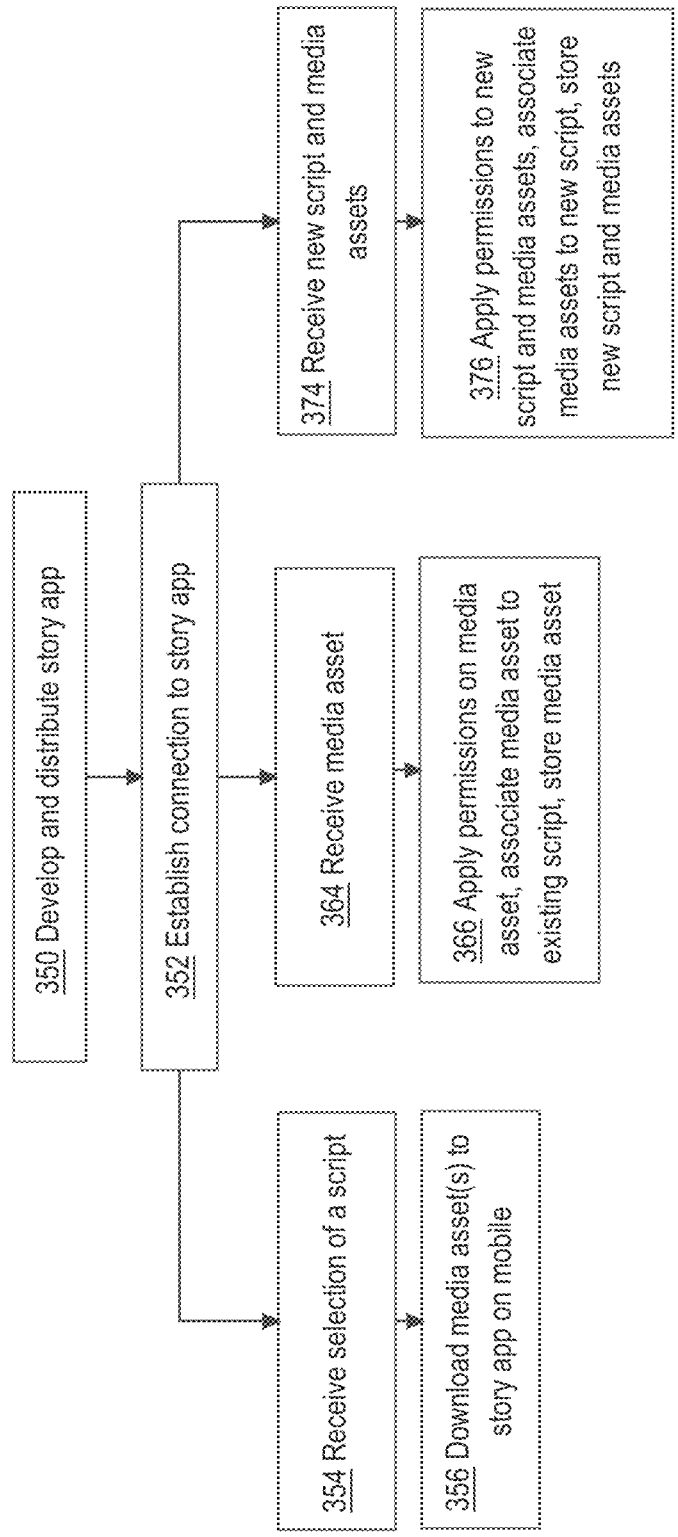
FIG. 3B illustrates an example programmed algorithm that may be used to implement an embodiment of a story application executed using a mobile computing device.

FIG. 3A illustrates an example programmed algorithm that may be used to implement an embodiment. For purposes of illustrating a clear example, FIG. 3A provides an overview of programmed functions that may be executed, in one embodiment, by elements of FIG. 1 to provide media presentations. However, other implementations of FIG. 3A may be used with embodiments other than shown in FIG. 1. FIG. 3A, FIG. 3B and each other flow diagram in this disclosure are intended to schematically represent an algorithm, process, or procedure that may be programmed to implement the functions that are described, and are shown at the same level of detail that is customarily used by persons having ordinary skill in the art to which this disclosure pertains to communicate among themselves about how to architect, organize, program and build computer program applications of the same class or type.

The process of FIG. 3A, at block 302, the process is programmed or configured to install a story app on a mobile device. For example, the mobile computing device 130 establishes a connection to an app store and downloads and installs a copy of the story application 136. Or, the mobile computing device 130 establishes a connection to the server computer 110 and downloads a copy of the story application 136 under control of the story service instance 112 and/or administration program 114. The specific manner by which the mobile computing device 106 obtains and installs an executable copy of story application 136 is not critical.

At block 304, the story app on the mobile device is launched. For example, the mobile computing device 130 receives a user touch signal indicating to launch the story application 136, and the operating system 138 responds by invoking and launching the story application 136.

At block 306, the story app connects via a network to a story service application on a server. For example, upon launching or otherwise during execution, the story application 136 at the mobile computing device 130 establishes a protocol-specific connection via the network 102 to the story service instance 112 of the server computer 110. Using the connection, in various embodiments, the story service instance 112 can authenticate or validate the story application 136 as a legitimate copy, determine what story script or story script the story application 136 has loaded or needs, set up an encrypted tunnel or fully encrypted protocol-specific connection, and other functions. In some embodiments, the story application 136 may present an application menu, tile display, box art display or other display of options, such as viewing scripts, creating scripts, and iterating scripts, available from the story application 136.

In response to the option of viewing scripts being selected, at block 308, the story app receives a selection of a script. For example, the mobile computing device 130 receives a touch signal indicating user selection of a particular story script via the story application 136. In some embodiments, the story application 136 is programmed to present a menu, tile display, box art display or other display of story scripts that have been installed on the mobile computing device 130 and/or that are available to mobile computing device 130 from server computer 110, based on permissions on the media assets 124. The story scripts displayed may include scripts that were selected based on popularity and/or recommended based on historical data. In other embodiments, block 308 may be omitted and launching the story application 136 may be equivalent to selecting a single available or installed story and executing or presenting it.

At block 310, the story app receives multimedia files associated with the selected script. The multimedia files may be downloaded from the server and/or retrieved from app memory on the mobile device. For example, the story application 108 may download media assets, such as scenes and/or clips, associated with the story script from the story service instance 112, based on permissions on the story scripts, directly or by interfacing to database 120, and/or may retrieve scenes and/or clips from in-app memory or other memory or storage on the mobile computing device 130. Clips downloaded from the story service instance 112 may be dynamically or randomly selected by the story service instance 112.

At block 312, the story app presents the multimedia files on the mobile device. For example, the story application 108 displays a scene (previously combined video clips) on the display device 134. Or, story application 108 is programmed to concurrently display a plurality of clips, one for each character in the story script, on the display device 134. When clips are combined or concurrently displayed, the actors in the clips appear to be having a conversation despite not knowing, when they were recording, what others would be saying and what their expressions would be. In this manner, the concurrent display of clips creates an element of surprise or punchline. In an embodiment, the story application 108 is programmed to receive feedback (e.g., likes, ratings, comments, etc.) regarding the script and/or the scene/clips. In an embodiment, the story application 108 is programmed to share the script and/or the scene/clips with other mobile computing devices 140, 150.

In an embodiment, block 310 and block 312 may be repeated to display other multimedia files associated with the script. For example, the mobile computing device 130 receives an advance signal to view other scenes and/or clips associated with the story script. In one embodiment, a single tap on the display device 134 constitutes an advance signal, but other embodiments may use swipes in any direction, double taps, or other gestures to signal advancement.

Additionally, or alternatively, in response to the option of creating scripts being selected, at block 318, the story app receives a name for the new script being created. For example, the story application 136 is programmed to present an input field for receiving a title for the new story script.

At block 320, the story app receives a script element for the new script. For example, the story application 136 is programmed to present an input field for receiving a script line. The script line is a collection of one or more consecutive directions for a character in the story script. A direction may be an acting direction or a reading direction and includes text written in one or more human-readable languages. The script line may include one or more swappable variables denoted by delimiters. In an embodiment, words in the script line that begin with a delimiter symbol is recognized as swappable variables when the script line is processed. The script line is added to a character in the story script.

At block 322, the story app processes the script element. For example, the story application 136 is programmed to evaluate the script line for time length. In an embodiment, story application 136 is programmed to invoke intelligent assistant 139 to determine the time length of the script line. The time length may be used to estimate a period of time for which the script line is to be displayed during a recording such that iterations for characters in the story script align when recordings are concurrently played, as further described herein.

The story application 136 is also programmed to evaluate the script line for variables. In an embodiment, story application 136 parses the script line to find words that begin with the "@" symbol and prompts for descriptions and associates the descriptions with the corresponding variables. In an embodiment, the story application 136 parses the script line to find descriptions that are between the "<" symbol and ">" symbol and associates the descriptions with the corresponding variables. In an embodiment, the story application 136 may confirm whether duplicated variables are intended. If duplicated variables are intended, then the same description is used for every instance of the variable. If duplicated variables are not intended, then the variables are distinguished by different variable words.

In an embodiment, block 320 and block 322 may be repeated to add new script elements. For example, the mobile computing device 130 receives an advance signal to add new script lines.

At block 324, the story app generates the script for preview. For example, the story application 136 is programmed to present the script lines of the story script on the display device 134. The story script may be edited to modify script lines or to add script lines or to delete script lines. In an embodiment, the story application 136 may be programmed to invoke intelligent assistant 139 to dictate the script lines during preview.

At block 326, the story app receives access rights for the script. For example, story application 136 is programmed to present different permission options for the story script and to set the permissions on the story script accordingly. Permissions may be set to restrict access to the story script to specific users. In an embodiment, the story application 136 may thereafter transmit the story script to server computer 110 for storage in database 120 and/or to other mobile computing devices 140, 150.

Additionally, or alternatively, in response to the option of iterating scripts being selected, at block 328, the story app receives a selection of a script. For example, the mobile computing device 130 receives a touch signal indicating user selection of a particular story script via the story application 136. In some embodiments, the story application 136 is programmed to present a menu, tile display, box art display or other display of story scripts that have been installed on the mobile computing device 130 and/or that are available to mobile computing device 130 from server computer 110, based on permissions on the media assets 124.

At block 330, the story app receives a selection of a character in the script. For example, the mobile computing device 130 receives a touch signal indicating user selection of a particular character, via story application 136, to iterate script lines for. In some embodiments, the story application 136 may present a menu, tile display, box art display or other display of characters for the story script.

At block 332, the story app receives user answers for the script. For example, the story application 136 is programmed to present, for each variable in the script lines for the character, a description and an input field for receiving a user answer. In an embodiment, the story application 136 is programmed to invoke the intelligent assistant 139 to determine the time length of each user answer to update time lengths for the script lines.

At block 334, the story app generates a recording of an iteration of the script. For example, the story application 136 is programmed to invoke the camera 132 to record and is programmed to present the script lines in a teleprompter manner during the recording. The script lines include user answers received at block 332 in lieu of the variables in the script lines. In an embodiment, the story application 136 is programmed to scroll each upcoming script line to the top of display device 134. The story application 136 is programmed to display a start indicator that signals the start of an act or a reading and a timer indicator that indicates an amount of time left to complete the script line. The time for the next script line for the actor to scroll up to the top of the display device 134 is based on a total time length of intermediary script lines belonging to other characters in the story script.

In an embodiment, the story application 136 may is also programmed to invoke the intelligent assistant 139 to verify that the actor is staying on script. For example, the intelligent assistant 139 may compare speech-to-text to the script lines and indicate to the story application 136 if there a match or mismatch. If the number of mismatches reaches a certain threshold, the story application 136 may stop recording.

The story application 108 is programmed to stop recording after the time is up for the last script line. A video clip is generated on the mobile computing device 130 after the recording has stopped.

At block 336, the story app concurrently displays multiple recordings for the script. For example, the story application 136 is programmed to receive clips for other characters in the story script and combine with the clip generated at block 334 for concurrent viewing on the display device 134. Clips may be displayed in different sizes or in the same size on the display device 134. Clips may be displayed side by side, or some clips may be overlaid on other clips. In an embodiment, the clip generated at block 334 is displayed in full screen mode, while the other clips are displayed as thumbnails that are overlaid on top of the clip displayed in full screen mode. When different clips are combined or concurrently displayed, the actors in the clips appear to be having a conversation despite not knowing, when they were recording, what others would be saying and what their expressions would be. In this manner, the concurrent display of clips creates an element of surprise or punchline. In an embodiment, the story application 136 is programmed to combine and compress the clips as a scene for storage and/or transmission.

At block 338, the story app receives access rights for the recording. For example, story application 136 is programmed to present different permission options for the clip and to set the permissions on the clip accordingly. Permissions may be set to restrict access to the clip to specific users. Similarly, permissions may be set to restrict access to the scene to specific users. In an embodiment, the story application 136 may transmit the scene and/or clips to the server computer 110 for storage in database 120 and/or to other mobile computing devices 140, 150.

In an embodiment, the options of viewing scripts, creating scripts, and/or iterating storing scripts may be made available for selection from different parts of story app and not only from a main application menu.

FIG. 3B illustrates an example programmed algorithm that may be used to implement an embodiment of a story application executed using a mobile computing device. FIG. 3B focuses on operations that may be executed at server computer 110 (FIG. 1) rather than end-user mobile computing devices.

At block 350, the story app is developed and distributed to app repositories or direct to mobile devices. For example, the story app is authored, compiled, tested and debugged, then copied to the APPLE APP STORE or GOOGLE PLAY STORE for distribution via downloads to end user devices. Or, executable binaries for the story app are hosted at the server computer 110 for download.

At block 352, a connection is established from the server computer 110 to one of the mobile devices at the time that the devices execute the story app. The connection may use an app-specific protocol, parameterized HTTP or other protocols, the specifics of which are not critical. What is important is that the story app at a mobile device, and the server computer 110, may establish either a long-lived session-based connection or a sessionless request-response connection for exchange of data.

At block 354, the server computer 110 receives a selection of a script, for example, in an app-specific protocol message that consists of a request to provide the script using a unique script identifier. At block 356, the server computer 110 downloads or streams to the story app on the mobile device media asset(s) needed to support the script. The media asset(s) may include clips (modular videos) or scenes (combined videos). The clips may be randomly chosen or selectively chosen according to user specification provided in the same or different request. Block 356 is typically executed while the story app is running on mobile devices. In an embodiment, the server computer 110 continuously receives and stores a user's behavioral data as historical data 126 in the database 120 and recommends scripts and/or media asset(s) based on the user's behavior data for a personalized experience. For example, at block 354, the server computer 1120 may receive feedback (e.g., likes, ratings, comments, etc.) regarding the script and/or the scene/clips and stores the feedback as historical data 126 in the database 120.

Additionally, or alternatively, at block 364, the server computer 110 receives or uploads a media asset, corresponding access rights, and other information relating to the media asset. In an embodiment, the media asset includes a clip. At block 366, the server computer 110 sets permissions on the media asset according to the access rights, associates the media asset with an existing story script in database 120 identified in the information, and stores the media asset in database 120.

Additionally, or alternatively, at block 374, the server computer 110 receives or uploads a new story script and corresponding access rights and media assets and corresponding access rights. In an embodiment, the media asset includes a clip for each character in the new story script and/or a scene. At block 376, the server computer 110 sets permissions on the new story script according to the corresponding access rights, sets permissions on each media asset according to the corresponding access rights, associates the media assets with the new story script, and stores the media asset and the new story script in database 120.

4. Example Story Creation and Presentation

FIG. 4, FIG. 5, FIG. 6, FIG. 7, FIG. 8, FIG. 9, FIG. 10, FIG. 11, FIG. 12, FIG. 13, FIG. 14, FIG. 15 illustrate a mobile computing device displaying progressive sequences of a story application via a graphical user interface. FIG. 4, FIG. 5, FIG. 6, FIG. 7, FIG. 8, FIG. 9, FIG. 10, FIG. 11, FIG. 12, FIG. 13, FIG. 14, FIG. 15 are intended to illustrate different states of visual presentation at display device 134 of the same mobile computing device 130 as different story scripts and media assets are created and presented, using the general process of FIG. 3A. FIG. 4, FIG. 5, FIG. 6, FIG. 7, FIG. 8, FIG. 9, FIG. 10, FIG. 11, FIG. 12, FIG. 13, FIG. 14, FIG. 15 represent only one brief example of a media creation and presentation, and other implementations or embodiments may be programmed or configured to present other media presentations in different ways, with different text, characters, videos and other media assets, of any length, number of assets or complexity.

Figure 4:
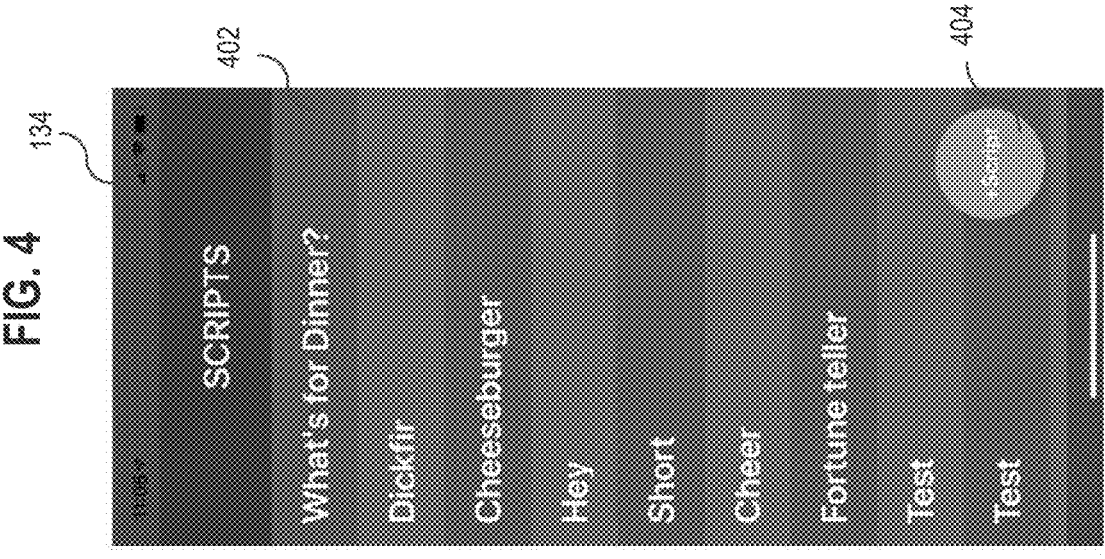

Viewing Scripts. FIG. 4 illustrates a display device 134 of a mobile computing device 130 showing a display, by a story application 136, of a list of available story scripts 402. The available story scripts 402 may include those available to the mobile computing device 130 from server computer 110 and those that are from app memory on the mobile computing device 130. Each available story script 402 in the list may be activated, such as by a tap input, to view related media assets. Related media assets include scenes and dynamical groupings of clips. A +Script icon 404 may be activated, such as by a tap input, to create a new story script.

Figure 5:
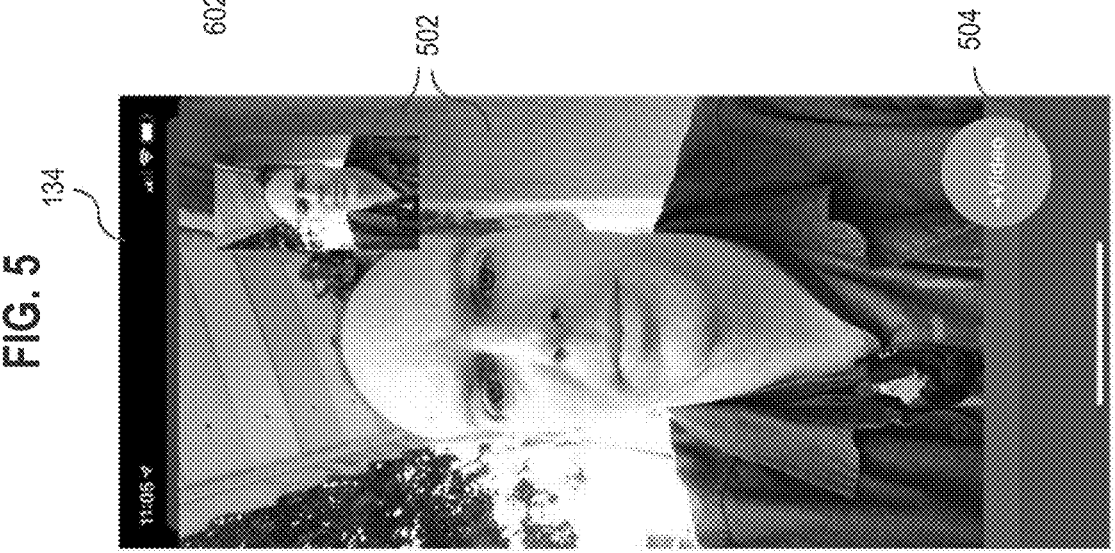

FIG. 5 illustrates the display device 134 showing a display, by the story application 136, of media asset(s) 502 for a selected story script. The media asset(s) may be two clips that are displayed simultaneously or may be one scene that is displayed. In an embodiment, a swipe input along an axis (e.g., horizontal axis) signals advancement to other media assets for the story script. In an embodiment, a tap input on a clip signals advancement to another clip for the story script, while the other clip shown is remains for concurrent display with the new clip. A +Video icon 504 may be activated, such as a tap input, to start an iteration for the story script. In an embodiment, when the +Video icon 504 is activated, available characters are shown for selection to iterate script lines for.

Figure 6:
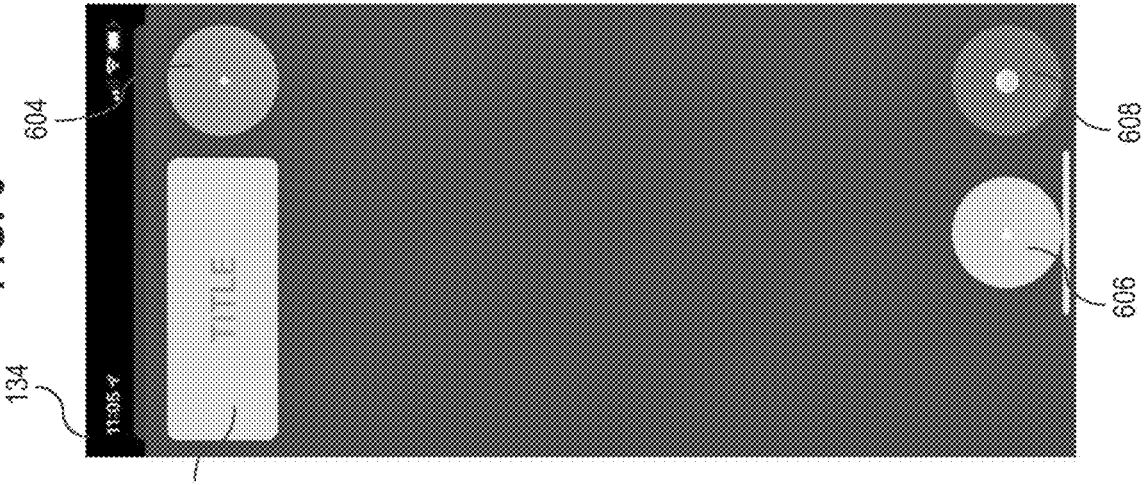

Creating Scripts. FIG. 6 illustrates the display device 134 showing a display, by the story application 136, of a title field 602, an add button 604, a play button 606, and a record button 608. An input in the title field 602 associates the input as an identifier for the new story script being created. The add button 604 may be activated, such as by a tap input, to add a script line to the story script. The play button 606 may be activated, such as by a tap input, to listen to the story script. The record button 608 may be activated to start a recording for a characters. In an embodiment, since no script lines have been added, the play button 606 and the record button 608 may be disabled.

Figure 7:
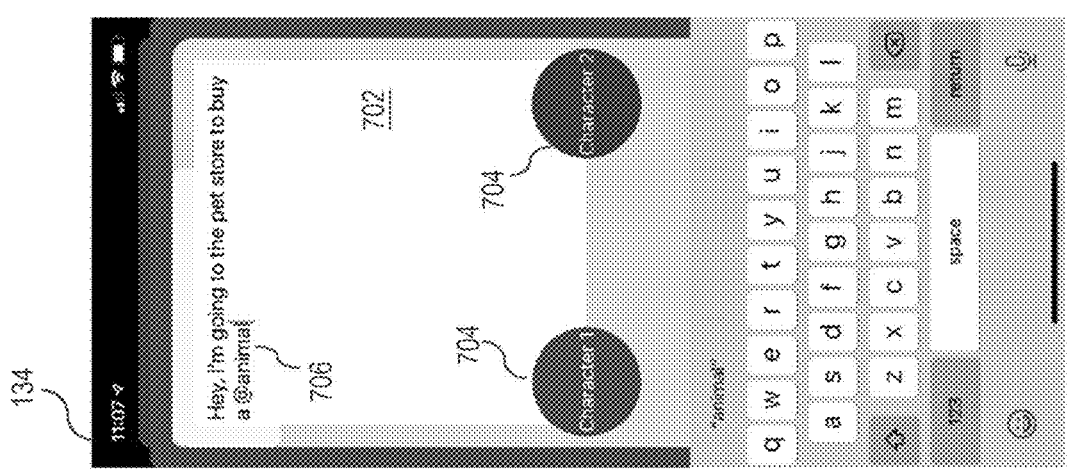

FIG. 7 illustrates the display device 134 showing a display, by the story application 136, a text field 702 and character buttons 704. An input in the text field 702 includes a script line to be added to the story script. The script line is written in one or more human-readable languages. Each swappable variable is denoted with a "@" symbol. In FIG. 7, the script line includes one variable. The word "animal" follows "@", which denotes it as a variable. The script line is added to a character by a tap input on one of the character buttons 704. In FIG. 7, two characters—Character 1 and Character 2—are associated story script. However, a story script may involve one character or more than two characters. During or after the script line is added, the script line is evaluated for time length and for variables.

Figure 8:
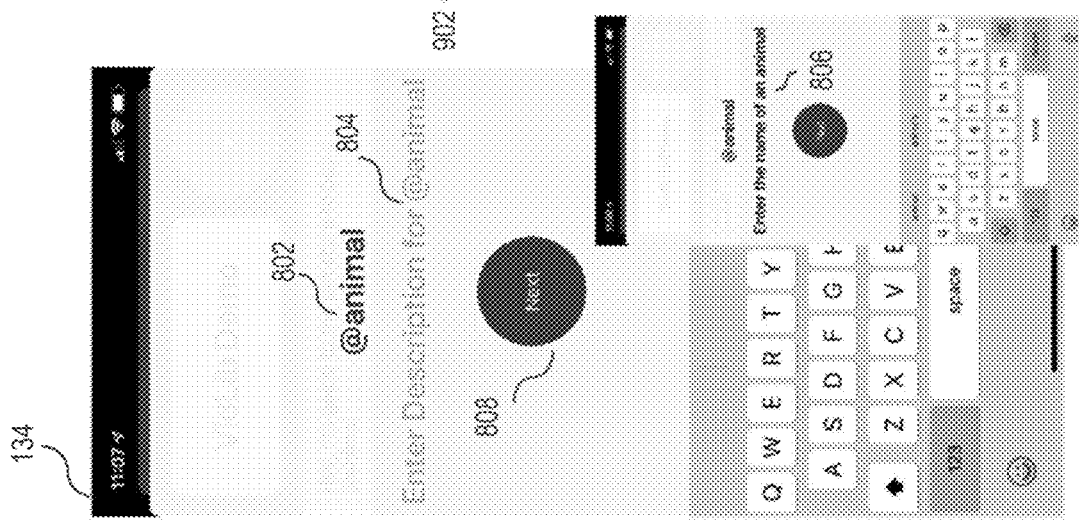

FIG. 8 illustrates the display device 134 showing a display, by the story application 136, a recognized variable 802 and a prompt 804 to enter a description 806 for the variable 802. Once the description 806 is provided, the description 806 is associated with the variable 802. In FIG. 8, the variable "animal" is associated with "Enter the name of an animal." A Next button 808 may be activated, such as by a tap input, to provide a description for the next variable.

Figure 9:
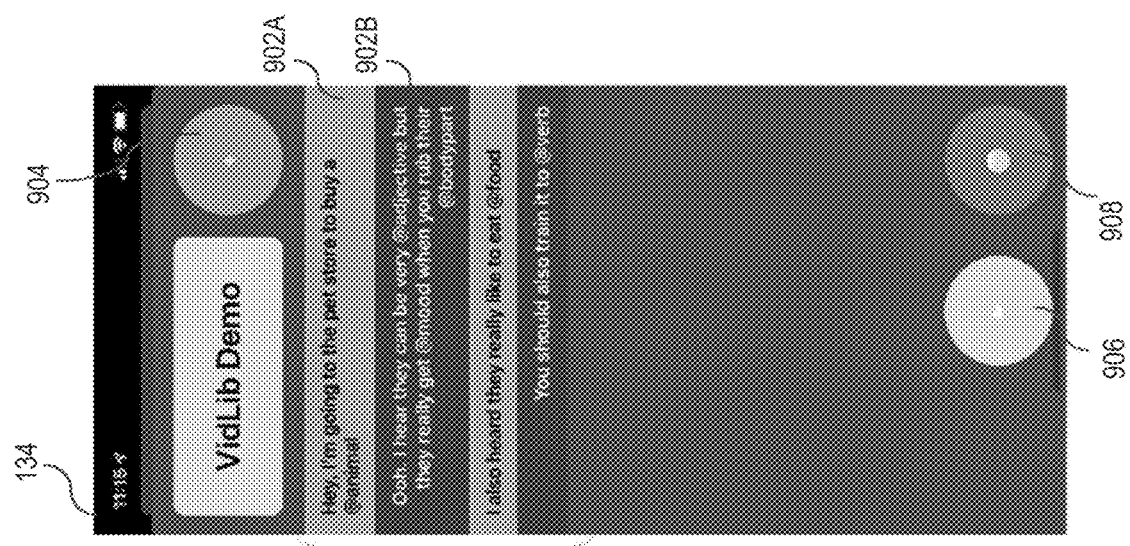

FIG. 9 illustrates the display device 134 showing a display, by the story application 136, a preview of script lines 902 entered. In FIG. 9, four (4) script lines were entered for the story script; two lines 902A are associated with Character 1, and two lines 902B are associated with Character 2. Each script line 902 may be activated, such as by a tap input, for editing. An add button 904 may be activated, such as by a tap input, to add a new line to the story script. A play button 906 button may be activated, such as by a tap input, to listen to the existing script 902. A record button 908 may be activated to start a recording for one of the characters (e.g., for Character 1).

Figure 10:
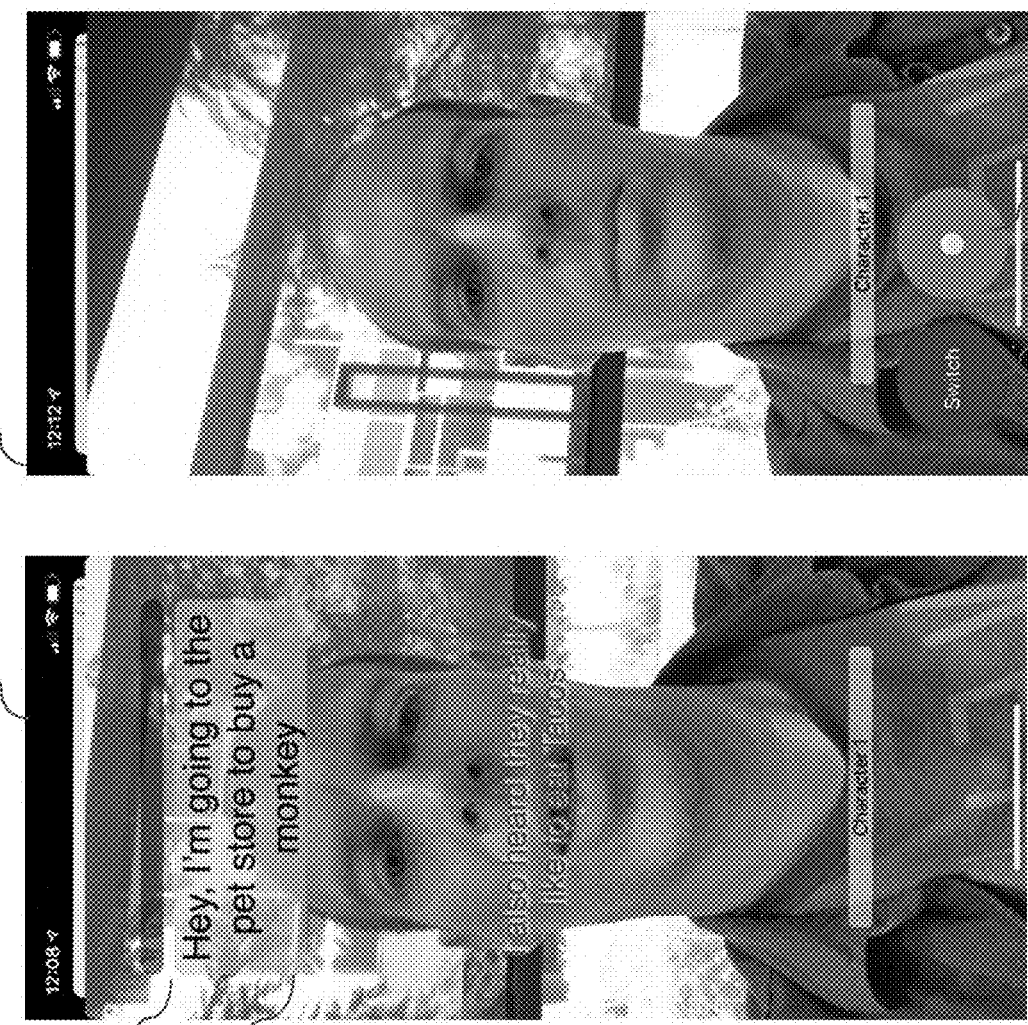

Iterating Scripts. FIG. 10 illustrates the display device 134 showing a display, by the story application 136, of prompt to enter a value for a swappable variable. Before video recording, the story application 136 checks for variables in the script lines for Character 1. If a variable exists, a description 1002 associated with the variable is displayed to prompt for user answer in field 1004. In FIG. 10, the story application 136 displays "Enter the name of the animal" for the variable "animal." User answer "Monkey" entered in the field 1004 is then associated with the variable "animal." A Next button 1006 may be activated, such as by a tap input, to provide a user answer for the next description.

Figure 11:
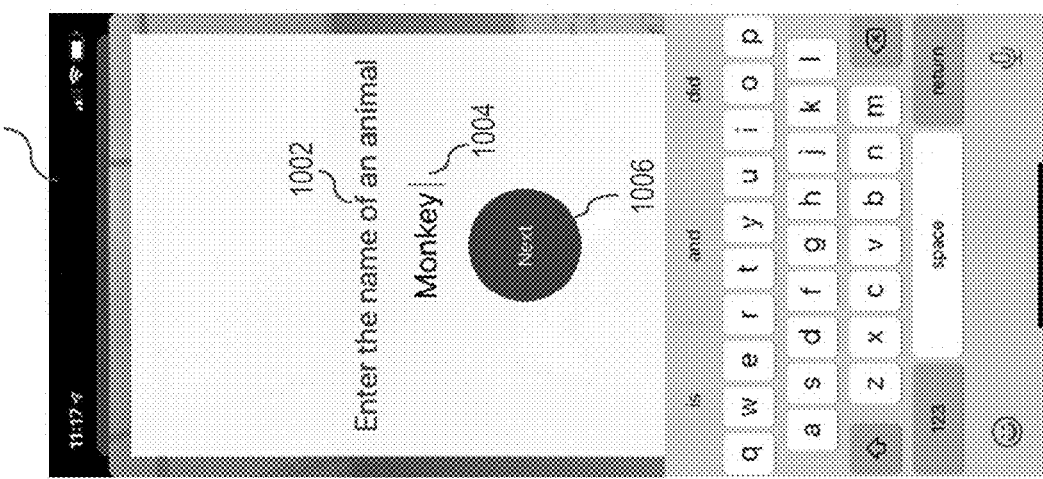

FIG. 11 illustrates the display device 134 showing a display, by the story application 136, of script lines for Character 1. During video recording, the script lines are displayed in a teleprompt fashion. Upcoming script line 1102 is scrolled to the top of display device 134. When the script line 1102 is highlighted, it signals actor to read aloud or act out the line. In an embodiment, acting directions are visually distinguished from reading directions (e.g., highlighted in different colors). A timer bar 1104 above the script line 1102 signals the amount of time the actor has to complete the line. User inputs previously entered replaces variables in the script lines. For example, user answer "monkey" 1102 is inserted into the script line 1102 such that the script line 1120 is "Hey, I'm going to the pet store to buy a monkey." The time for the next script line "I also heard they really like to eat Tacos" to scroll up to the top of the display device 134 is based on a total time length of intermediary script lines belonging to other characters in the story script.

Figure 12:
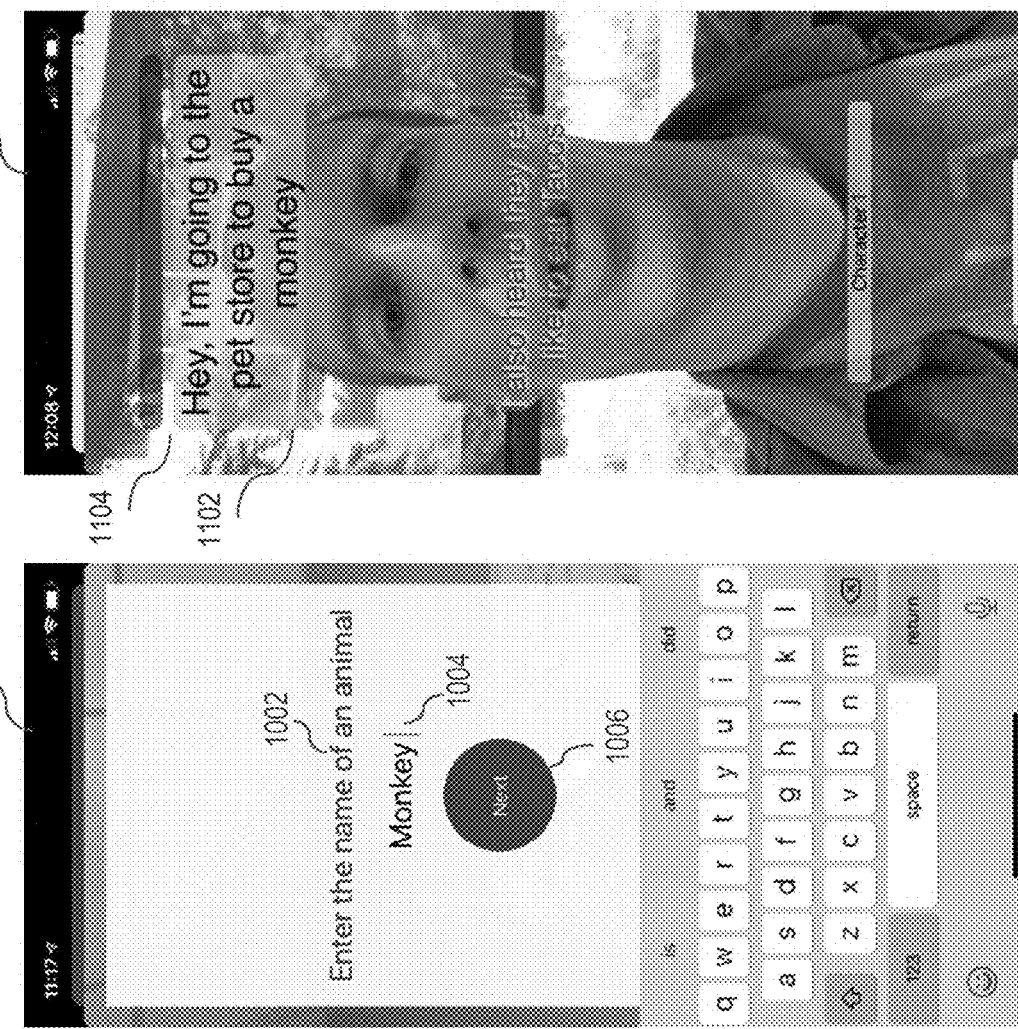

FIG. 12 illustrates the display device 134 showing a display, by the story application 136, of completion of a first recording (e.g., for Character 1), including a switch button 1202 and a record button 1204. The switch button 1202 button may be activated, such as by a tap input, to switch to another character (e.g., Character 2). The record button 1204 may be activated to record a reiteration for Character 1.

FIG. 13 illustrates the display device 134 showing a display, by the story application 136, of completion of a final recording (e.g., for Character 2) for the story script, including a switch button 1302, a record button 1304, and a continue button 1306. The switch button 1302 may be activated, such as by a tap input, to switch to another character (e.g., Character 1). The record button 1304 may be activated, such as by a tap input, to record a reiteration for Character 2. The continue button 1306 may be activated, such as by a tap input, to preview the video clips for Character 1 and Character 2.

Previewing a combined video. FIG. 14 illustrates the display device 134 showing a display, by the story application 136, of a video preview, including an upload button 1402, a play button 1404, and a share button 1406. The upload button 1402 may be activated, such as by a tap input, to upload clips (video for Character 1, video for Character 2) and/or a scene (combined video) to the server computer 110. The play button 1404 may be activated, such as by a tap input, to concurrently play the clips 1408. The share button 1406 may be activated, such as by a tap input, to share the scene to others via a plurality of applications available on the mobile computing device 130.

Sharing a combined video. FIG. 15 illustrates the display device 134 showing a display, by the story application 136, of a share screen including a share sheet 1502. The share sheet 1502 includes different sharing options, such as via text messaging, social applications, email. The share sheet 1502 provides other functionalities available on the mobile computing device 130.

Embodiments are specifically programmed to implement generation, presentation and sharing of media and/or entertainment functions according to a scripted story, using a mobile computing device, for informational, educational or entertainment purposes. Different actors may iterate for the same character in a story to create different interpretations of the story. Story scripts may be revised to create new stories or conversations. Recorded iterations for different characters in a story are combined for viewing and sharing. In this manner, actors interact or participate without first seeing or understanding the story, thereby creating an element of surprise or punchline when the recordings for the story are combined. Therefore, the mobile computing device acquires new, hybrid utility as both a conventional social media platform for the user and an educational, informational or entertainment presentation platform that is driven by a story application and story script.

Furthermore, the embodiments of this disclosure overcome the technical problems described in the Background by enabling efficient communication of multiple mobile computing devices, which are separated by a large wide geographic area, to independently record different segments of video relating to a unified script and then combine the video using mobile app functions or cloud-based server functions. Rather than sharing video clips by sending e-mail attachments, uploading to cloud storage, or some form of in-app messaging, followed by manual editing, joining or stitching together, embodiments enable different mobile devices at different physical or geographical locations to independently record video segments corresponding to discrete characters or roles in a script; under program control, the video segments may be combined into a unified work that is playable as if edited or stitched or even as if recorded in a single location with multiple cameras. For example, if a first mobile device user formulates a script for a scene or a story, and more than one character is needed, then embodiments provide an efficient way to arrange the recording of all parts of the script by multiple characters using multiple mobile devices in separated or distant locations, and then join all the recordings into a complete video. Using these techniques, embodiments achieve the use of less memory, online storage, network messages and CPU cycles than in prior techniques. Embodiments also achieve faster assembly of multiple video segments that are recorded in different locations or with different devices for different characters and roles, greatly reducing the time needed to create a unified or edited video. Therefore, device efficiency is improved because the use of computer resources is reduced.

5. Implementation Example—Computer Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
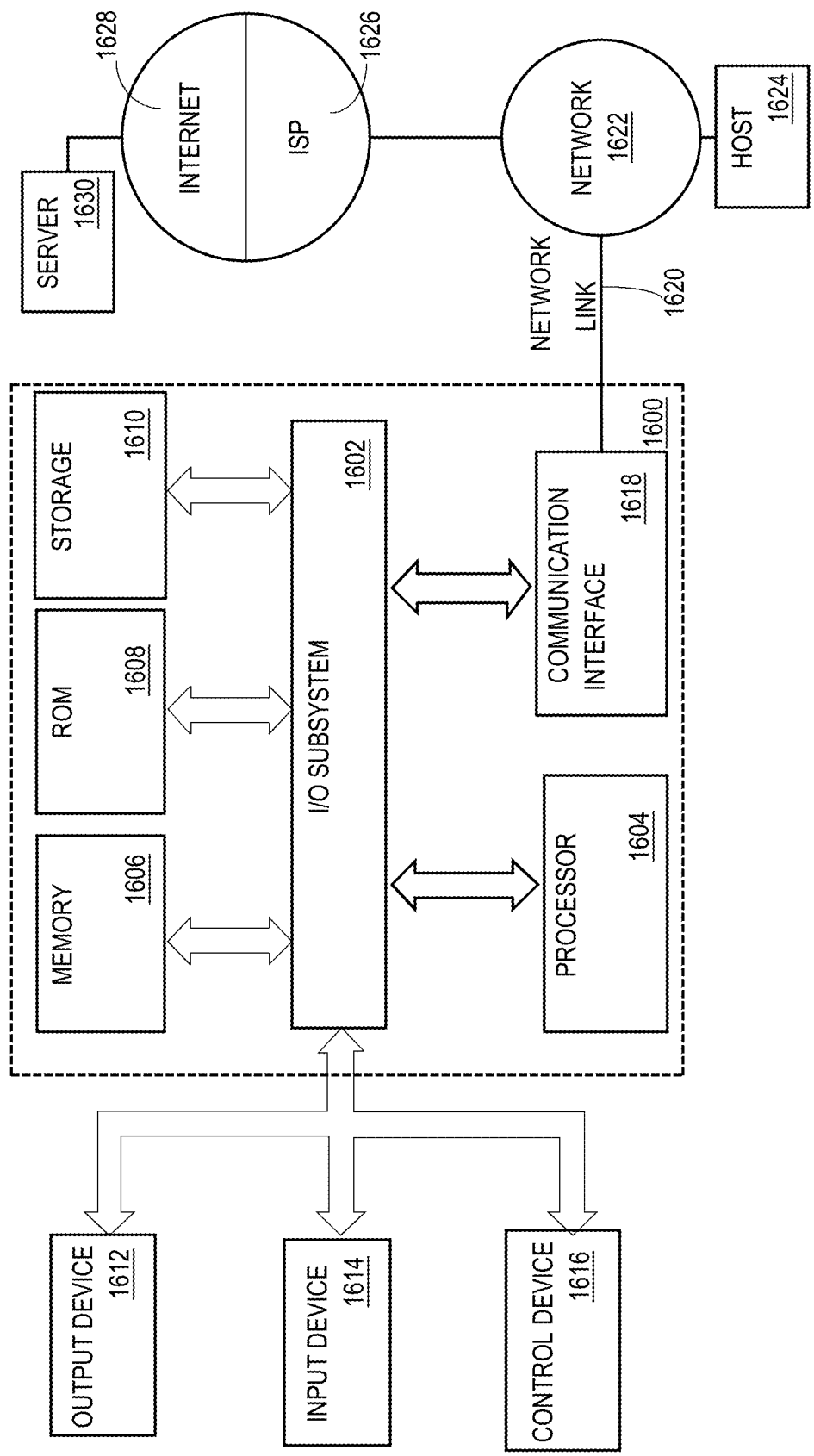
FIG. 16 illustrates an example computer system with which some aspects of embodiments may be implemented.

FIG. 16 illustrates an example computer system with which some aspects of embodiments may be implemented. In the example of FIG. 16, a computer system 1600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1600 includes an input/output (I/O) subsystem 1602 which may include a bus and/or other communication mechanism(s) for communicating information and/or instructions between the components of the computer system 1600 over electronic signal paths. The I/O subsystem 1602 may include an I/O controller, a memory controller and at least one I/O port. The electronic signal paths are represented schematically in the drawings, for example as lines, unidirectional arrows, or bidirectional arrows.

At least one hardware processor 1604 is coupled to I/O subsystem 1602 for processing information and instructions. Hardware processor 1604 may include, for example, a general-purpose microprocessor or microcontroller and/or a special-purpose microprocessor such as an embedded system or a graphics processing unit (GPU) or a digital signal processor or ARM processor. Processor 1604 may comprise an integrated arithmetic logic unit (ALU) or may be coupled to a separate ALU.

Computer system 1600 includes one or more units of memory 1606, such as a main memory, which is coupled to I/O subsystem 1602 for electronically digitally storing data and instructions to be executed by processor 1604. Memory 1606 may include volatile memory such as various forms of random-access memory (RAM) or other dynamic storage device. Memory 1606 also may be used for storing temporary variables or other intermediate information during execution of instructions to be executed by processor 1604. Such instructions, when stored in non-transitory computer-readable storage media accessible to processor 1604, can render computer system 1600 into a special-purpose machine that is customized to perform the operations specified in the instructions.

Computer system 1600 further includes non-volatile memory such as read only memory (ROM) 1608 or other static storage device coupled to I/O subsystem 1602 for storing information and instructions for processor 1604. The ROM 1608 may include various forms of programmable ROM (PROM) such as erasable PROM (EPROM) or electrically erasable PROM (EEPROM). A unit of persistent storage 1610 may include various forms of non-volatile RAM (NVRAM), such as FLASH memory, or solid-state storage, magnetic disk or optical disk such as CD-ROM or DVD-ROM and may be coupled to I/O subsystem 1602 for storing information and instructions. Storage 1610 is an example of a non-transitory computer-readable medium that may be used to store instructions and data which when executed by the processor 1604 cause performing computer-implemented methods to execute the techniques herein.

The instructions in memory 1606, ROM 1608 or storage 1610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1600 may be coupled via I/O subsystem 1602 to at least one output device 1612. In one embodiment, output device 1612 is a digital computer display. Examples of a display that may be used in various embodiments include a touch screen display or a light-emitting diode (LED) display or a liquid crystal display (LCD) or an e-paper display. Computer system 1600 may include other type(s) of output devices 1612, alternatively or in addition to a display device. Examples of other output devices 1612 include printers, ticket printers, plotters, projectors, sound cards or video cards, speakers, buzzers or piezoelectric devices or other audible devices, lamps or LED or LCD indicators, haptic devices, actuators or servos.

At least one input device 1614 is coupled to I/O subsystem 1602 for communicating signals, data, command selections or gestures to processor 1604. Examples of input devices 1614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1616, which may perform cursor control or other automated control functions such as navigation in a graphical interface on a display screen, alternatively or in addition to input functions. Control device 1616 may be a touchpad, a mouse, a trackball, or cursor direction keys for communicating direction information and command selections to processor 1604 and for controlling cursor movement on display 1612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1614 may include a combination of multiple different input devices, such as a video camera and a depth sensor.

In another embodiment, computer system 1600 may comprise an internet of things (IoT) device in which one or more of the output devices 1612, input device 1614, and control device 1616 are omitted. Or, in such an embodiment, the input device 1614 may comprise one or more cameras, motion detectors, thermometers, microphones, seismic detectors, other sensors or detectors, measurement devices or encoders and the output device 1612 may comprise a special-purpose display such as a single-line LED or LCD display, one or more indicators, a display panel, a meter, a valve, a solenoid, an actuator or a servo.

When computer system 1600 is a mobile computing device, input device 1614 may comprise a global positioning system (GPS) receiver coupled to a GPS module that is capable of triangulating to a plurality of GPS satellites, determining and generating geo-location or position data such as latitude-longitude values for a geophysical location of the computer system 1600. Output device 1612 may include hardware, software, firmware and interfaces for generating position reporting packets, notifications, pulse or heartbeat signals, or other recurring data transmissions that specify a position of the computer system 1600, alone or in combination with other application-specific data, directed toward host 1624 or server 1630.

Computer system 1600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1600 in response to processor 1604 executing at least one sequence of at least one instruction contained in main memory 1606. Such instructions may be read into main memory 1606 from another storage medium, such as storage 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1610. Volatile media includes dynamic memory, such as memory 1606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1602. Transmission media can also take the form of acoustic or light waves, such as those generated during radio-wave and infra-red data communications.

Various forms of media may be involved in carrying at least one sequence of at least one instruction to processor 1604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1600 can receive the data on the communication link and convert the data to a format that can be read by computer system 1600. For instance, a receiver such as a radio frequency antenna or an infrared detector can receive the data carried in a wireless or optical signal and appropriate circuitry can provide the data to I/O subsystem 1602 such as place the data on a bus. I/O subsystem 1602 carries the data to memory 1606, from which processor 1604 retrieves and executes the instructions. The instructions received by memory 1606 may optionally be stored on storage 1610 either before or after execution by processor 1604.

Computer system 1600 also includes a communication interface 1618 coupled to bus 1602. Communication interface 1618 provides a two-way data communication coupling to network link(s) 1620 that are directly or indirectly connected to at least one communication networks, such as a network 1622 or a public or private cloud on the Internet. For example, communication interface 1618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1622 broadly represents a local area network (LAN), wide-area network (WAN), campus network, internetwork or any combination thereof. Communication interface 1618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1618 sends and receives electrical, electromagnetic or optical signals over signal paths that carry digital data streams representing various types of information.

Network link 1620 typically provides electrical, electromagnetic, or optical data communication directly or through at least one network to other data devices, using, for example, satellite, cellular, Wi-Fi, or BLUETOOTH technology. For example, network link 1620 may provide a connection through a network 1622 to a host computer 1624.

Furthermore, network link 1620 may provide a connection through network 1622 or to other computing devices via internetworking devices and/or computers that are operated by an Internet Service Provider (ISP) 1626. ISP 1626 provides data communication services through a world-wide packet data communication network represented as internet 1628. A server computer 1630 may be coupled to internet 1628. Server 1630 broadly represents any computer, data center, virtual machine or virtual computing instance with or without a hypervisor, or computer executing a containerized program system such as DOCKER or KUBERNETES. Server 1630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1600 and server 1630 may form elements of a distributed computing system that includes other computers, a processing cluster, server farm or other organization of computers that cooperate to perform tasks or execute applications or services. Server 1630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1630 may comprise a web application server that hosts a presentation layer, application layer and data storage layer such as a relational database system using structured query language (SQL) or no SQL, an object store, a graph database, a flat file system or other data storage.

Computer system 1600 can send messages and receive data and instructions, including program code, through the network(s), network link 1620 and communication interface 1618. In the Internet example, a server 1630 might transmit a requested code for an application program through Internet 1628, ISP 1626, local network 1622 and communication interface 1618. The received code may be executed by processor 1604 as it is received, and/or stored in storage 1610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1604. While each processor 1604 or core of the processor executes a single task at a time, computer system 1600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of operating a digital video presentation service with a distributed computer system comprising a server computer and at least a first mobile computing device and a second mobile computing device, the method comprising the computer-implemented steps of:
    downloading copies of a story application to at least a first mobile computing device and a second mobile computing device;
    using the story application and under control of a programmed story script, the story application presenting the lines of the story script in a display of the first mobile computing device;
    the story script being programmed with a plurality of script lines for two or more characters, each of the script lines comprising at least a reading direction having text in a human-readable language, each of the script lines comprising one or more swappable variables, each of the swappable variables having a readable description, each of the swappable variables comprising a delimiter symbol, the story application being programmed to recognize the delimiter symbol as a swappable variable;
    using the story application and under control of the programmed story script, the story application invoking a first camera of the first mobile computing device and causing recording a first video clip of a first iteration of a first character while presenting the lines of the story script in the display of the first mobile computing device;
    using the story application and under control of the programmed story script, the story application invoking a second camera of the second mobile computing device and causing recording a second video clip of a first iteration of a second character while presenting other lines of the story script in a second display of the second mobile computing device;
    combining the first video clip and the second clip to form a new clip;
    causing presenting the new clip at the first mobile computing device.

2. The method of claim 1, further comprising receiving a third or subsequent video clip for one or more other characters of the story, combining the third or subsequent video clip with the new clip to form a resulting new clip, and causing presenting the resulting new clip at the first mobile computing device.

3. The method of claim 1, further comprising receiving, during the recording of at least the first video clip, a spoken value for each of the swappable variables.

4. The method of claim 1, further comprising:
    as each of the lines of the story script is displayed, causing scrolling each upcoming line to a top of the display of the first mobile computing device;
    causing displaying a start indicator to signal to start reading within an associated time period;
    causing displaying an amount of time remaining for the reading;
    scrolling a next script line to the top of the display of the mobile computing device based on a total time length of intermediary script lines of other characters.

5. The method of claim 1, further comprising, for each particular script line among the lines of the story script, evaluating the particular script line to determine a time length, and presenting the particular script line in the display of the first mobile computing device for the time length.

6. The method of claim 1, further comprising executing one or more of:
    uploading the first video clip and the second clip to the server computer, using the server computer to combine the first video clip and the second clip to form the new clip, and downloading the new clip to the first mobile computing device and the second mobile computing device;
    using the second mobile computing device, transmitting the second video clip to the first mobile computing device and using the first mobile computing device to combine the first video clip and the second clip to form the new clip.

7. A computer-implemented method for execution using a server computer and at least a first mobile computing device and a second mobile computing device, the method comprising the computer-implemented steps of:
    downloading copies of a story application to at least the first mobile computing device and the second mobile computing device;
    using the story application, retrieving a story script that is programmed with a plurality of script lines for two or more characters, each of the script lines comprising at least a reading direction having text in a human-readable language, each of the script lines comprising one or more swappable variables, each of the swappable variables having a readable description, each of the swappable variables comprising a delimiter symbol, the story application being programmed to recognize the delimiter symbol as a swappable variable;
    receiving and storing a plurality of answers to each readable description of each of the swappable variables;
    using the story application and under control of a programmed story script, the story application presenting the lines of the story script in a display of the first mobile computing device, each of the lines of the story script including one or more of the answers to each readable description of each of the swappable variables in lieu of the swappable variables;
    using the story application and under control of the programmed story script, the story application invoking a first camera of the first mobile computing device and causing recording a first video clip of a first iteration of a first character while presenting the lines of the story script in a display of the first mobile computing device;
    receiving, during the recording of at least the first video clip, a spoken value for each of the swappable variables;
    using the story application and under control of the programmed story script, the story application invoking a second camera of the second mobile computing device and causing recording a second video clip of a first iteration of a second character while presenting other lines of the story script in a second display of the second mobile computing device;
    combining the first video clip and the second clip to form a new clip;

causing presenting the new clip at the first mobile computing [[device;]] device.

8. The method of claim 7, further comprising:
as each of the lines of the story script is displayed, causing scrolling each upcoming line to a top of the display of the first mobile computing device;
causing displaying a start indicator to signal to start reading within an associated time period;
causing displaying an amount of time remaining for the reading;
scrolling a next script line to the top of the display of the mobile computing device based on a total time length of intermediary script lines of other characters.

9. The method of claim 7, further comprising, for each particular script line among the lines of the story script, evaluating the particular script line to determine a time length, and presenting the particular script line in the display of the first mobile computing device for the time length.

10. The method of claim 7, further comprising receiving a third or subsequent video clip for one or more other characters of the story, combining the third or subsequent video clip with the new clip to form a resulting new clip, and causing presenting the resulting new clip at the first mobile computing device.

11. The method of claim 7, further comprising executing one or more of:
uploading the first video clip and the second clip to the server computer, using the server computer to combine the first video clip and the second clip to form the new clip, and downloading the new clip to the first mobile computing device and the second mobile computing device;
using the second mobile computing device, transmitting the second video clip to the first mobile computing device and using the first mobile computing device to combine the first video clip and the second clip to form the new clip.

12. One or more non-transitory computer-readable storage media storing sequences of instructions which, when executed using one or more processors, cause the one or more processors to execute:
downloading copies of a story application to at least a first mobile computing device and a second mobile computing device;
using the story application and under control of a programmed story script, the story application presenting the lines of the story script in a display of the first mobile computing device;
the story script being programmed with a plurality of script lines for two or more characters, each of the script lines comprising at least a reading direction having text in a human-readable language, each of the script lines comprising one or more swappable variables, each of the swappable variables having a readable description, each of the swappable variables comprising a delimiter symbol, the story application being programmed to recognize the delimiter symbol as a swappable variable;
using the story application and under control of the programmed story script, the story application invoking a first camera of the first mobile computing device and causing recording a first video clip of a first iteration of a first character while presenting the lines of the story script in a display of the first mobile computing device;
using the story application and under control of the programmed story script, the story application invoking a second camera of the second mobile computing device and causing recording a second video clip of a first iteration of a second character while presenting other lines of the story script in a second display of the second mobile computing device;
combining the first video clip and the second clip to form a new clip;
causing presenting the new clip at the first mobile computing device.

13. The computer-readable media of claim 12, further comprising sequences of instructions which when executed cause performing: receiving a third or subsequent video clip for one or more other characters of the story, combining the third or subsequent video clip with the new clip to form a resulting new clip, and causing presenting the resulting new clip at the first mobile computing device.

14. The computer-readable media of claim 12, further comprising sequences of instructions which when executed cause performing: receiving, during the recording of at least the first video clip, a spoken value for each of the swappable variables.

15. The computer-readable media of claim 12, further comprising sequences of instructions which when executed cause performing:
as each of the lines of the story script is displayed, causing scrolling each upcoming line to a top of the display of the first mobile computing device;
causing displaying a start indicator to signal to start reading within an associated time period;
causing displaying an amount of time remaining for the reading;
scrolling a next script line to the top of the display of the mobile computing device based on a total time length of intermediary script lines of other characters.

16. The computer-readable media of claim 12, further comprising sequences of instructions which when executed cause performing: for each particular script line among the lines of the story script, evaluating the particular script line to determine a time length, and presenting the particular script line in the display of the first mobile computing device for the time length.

17. The computer-readable media of claim 12, further comprising sequences of instructions which when executed cause performing one or more of:
uploading the first video clip and the second clip to a server computer, using the server computer to combine the first video clip and the second clip to form the new clip, and downloading the new clip to the first mobile computing device and the second mobile computing device;
using the second mobile computing device, transmitting the second video clip to the first mobile computing device and using the first mobile computing device to combine the first video clip and the second clip to form the new clip.

* * * * *